US008817010B2

(12) United States Patent
Park et al.

(10) Patent No.: US 8,817,010 B2
(45) Date of Patent: Aug. 26, 2014

(54) CIRCUIT FOR CONTROLLING DATA DRIVER AND DISPLAY DEVICE INCLUDING THE SAME

(75) Inventors: Dong Chul Park, Suwon-si (KR); Seung-Hyun Kim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 305 days.

(21) Appl. No.: 13/151,331

(22) Filed: Jun. 2, 2011

(65) Prior Publication Data

US 2011/0298781 A1 Dec. 8, 2011

(30) Foreign Application Priority Data

Jun. 4, 2010 (KR) ........................ 10-2010-0052970

(51) Int. Cl.
*G06F 3/038* (2013.01)
*G09G 5/00* (2006.01)

(52) U.S. Cl.
USPC .............. 345/212; 345/60; 345/100; 345/204

(58) Field of Classification Search
USPC .................................... 345/212, 60, 100, 204
See application file for complete search history.

(56) References Cited

U.S. PATENT DOCUMENTS 6,943,780 B1 * 9/2005 Van Dijk ........................ 345/204
7,199,662 B2 * 4/2007 Seko ............................. 330/261
2003/0058232 A1 * 3/2003 Washio et al. ................ 345/204
2006/0071928 A1 4/2006 Morita
2006/0125759 A1 6/2006 An

FOREIGN PATENT DOCUMENTS

JP 2001-343944 A 12/2001
JP 2006-106398 A 4/2006
KR 10-2006-0052025 A 5/2006
KR 10-2006-0064941 A 6/2006

* cited by examiner

*Primary Examiner* — Kevin M Nguyen
*Assistant Examiner* — Kenneth B Lee, Jr.
(74) *Attorney, Agent, or Firm* — Lee & Morse, P.C.

(57) ABSTRACT

Circuits for controlling a data driver of a display device are provided. The circuit may include a bias block that may output a first or second bias current or voltage to the data driver and a control unit that may control the bias block to output the first or second bias current or voltage based on a control signal.

19 Claims, 4 Drawing Sheets

CIRCUIT FOR CONTROLLING DATA DRIVER AND DISPLAY DEVICE INCLUDING THE SAME

CROSS-REFERENCE TO RELATED APPLICATIONS

This application claims priority under 35 U.S.C. §119 to Korean Patent Application No. 10-2010-0052970, filed on Jun. 4, 2010, in the Korean Intellectual Property Office, and entitled: "Circuit for Controlling Data Driver and Display Device Including the Same," which is incorporated by reference herein in its entirety.

BACKGROUND

1. Field

Embodiments relate to a circuit for controlling a data driver and a display device including the same. More particularly, embodiments relate to a circuit for controlling a data driver to reduce the amount of current or voltage consumed by display devices and a display device including the same.

2. Description of the Related Art

With the recent increase in resolution of driver integrated circuits (ICs), a required slew rate has increased. Accordingly, it has been necessary to provide more current or voltage to data drivers in display devices.

SUMMARY

Embodiments are therefore directed to circuits capable of improving efficiency by reducing an amount of current or voltage consumed by a display device while enabling an increased slew rate relative to conventional circuits.

One or more embodiments may provide a circuit for controlling a data driver of a display device, the circuit including a bias block configured to provide a bias power to the data driver, and a control unit configured to control the bias block to selectively output one of a first bias power and a second bias power, which have different magnitudes, to the data driver based on a control signal input to the control unit, wherein the bias block provides the first bias power or the second bias power to the data driver according to control of the control unit.

The magnitude of the first bias power may be greater than that of the second bias power.

The control unit may control the bias block to output the first bias power when the control signal is at a first logic level and may control the bias block to output the second bias power when the control signal is at a second logic level.

The control signal may vary with a data or source signal.

One or more embodiments may provide a display device including a panel including a plurality of pixels arranged in a matrix form, a timing controller configured to output a plurality of control signals, a data driver configured to output data signals to data lines connected to the plurality of pixels based on one of the plurality of control signals output from the timing controller, and a control circuit configured to selectively provide one of a first bias power and a second bias power, which have different magnitudes, to the data driver based on one of the plurality of control signals.

The display device may include a gate driver configured to output signals for turning on or off switching elements of the respective pixels based on one among the plurality of control signals output from the timing controller.

The magnitude of the first bias power may be greater than that of the second bias power.

The control circuit may include a bias block configured to selectively output one of the first bias power and the second bias power to the data driver, and a control unit configured to control the bias block to selectively output one of the first bias power and the second bias power based on one among the plurality of control signals output from the timing controller.

The control unit may control the bias block to output the first bias power when the control signal is at a first logic level and controls the bias block to output the second bias power when the control signal is at a second logic level.

The panel may include at least one color data line connected to each of the data lines.

Each of the data lines may be connected to the at least one color data line via at least one switch, which is turned on or off based on at least one switch control signal output from the data driver.

The data driver may include a switch control block configured to output the at least one switch control signal based on one among the plurality of control signals output from the timing controller and to turn on or off the at least one switch.

The at least one switch receiving the at least one switch control signal may be turned on when the at least one switch control signal is at a first logic level and may be turned off when the at least one switch control signal is at a second logic level.

The data driver may further include an amplifier connected to each of the data lines.

The amplifier may receive the first bias power or the second bias power from the bias block.

The control unit may be configured to control the bias block to output the first bias power when one of the at least one switch control signal is at a first logic level.

The control unit may control the bias block to output the second bias power when all of the at least one switch control signal is at a second logic level.

The control signal may be at the first logic level while data signals output from the data driver are supplied to at least one capacitor in the panel.

One or more embodiments may provide a circuit for controlling a data driver of a display device including a panel including a plurality of pixels, the circuit including a biasing block configured to supply one of a plurality of different biasing powers to the data driver, a selector configured to select one of the plurality of different biasing powers, wherein the plurality of biasing powers include a first biasing power and a second biasing power, the first biasing power being greater than the second biasing power, and the selector is configured to select the first biasing power to be supplied to the data driver when an operation having an increased slew rate is being performed.

The first biasing power may be supplied during a period when data signals output from the data driver are supplied to at least one capacitor in the panel.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
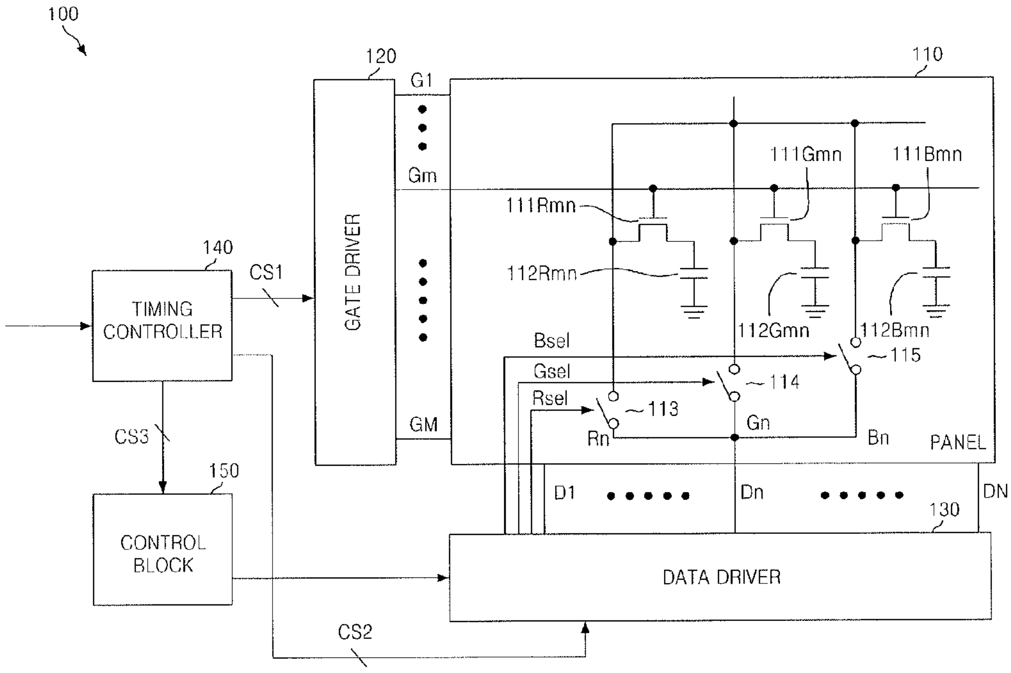
FIG. 1 illustrates a circuit diagram of an exemplary embodiment of a display device.

Exemplary embodiments will be described more fully hereinafter with reference to the accompanying drawings illustrating exemplary embodiments. Features may, however, be embodied in many different forms and should not be construed as limited to the embodiments set forth herein. Rather, these embodiments are provided so that this disclosure will be thorough and complete, and will fully convey the scope of the features to those skilled in the art. In the drawings, the size and relative sizes of layers and regions may be exaggerated for clarity. Like numbers refer to like elements throughout the specification.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 illustrates a circuit diagram of an exemplary embodiment of a display device 100. The display device 100 may include a panel 110, a gate driver 120, a data driver 130, a timing controller 140, and a control block 150.

The panel 110 may include a plurality of pixels arranged in a matrix form. The timing controller 140 may generate a plurality of control signals CS1 and CS2 for controlling the gate driver 120 and the data driver 130.

The gate driver 120 may output signals for turning on or off switching elements 111Rmn, 111Gmn, and 111Bmn corresponding to the pixels associated with gate lines G1 through GM in response to the first control signal CS1. Among the gate lines G1 through Gm, the m-th gate line Gm is shown in FIG. 1 as an example.

The data driver 130 may include a plurality of source drivers. The source drivers may be driven based on a plurality of power supplies and may respectively output data signals to data lines D1 through DN in response to the second control signal CS2 output from the timing controller 140.

Color data lines may be provided for color components, respectively, included in each pixel. In detail, red data lines R1 through RN, green data lines G1 through GN, and blue data lines B1 through BN may be provided. Among those color data lines, the color data lines Rn, Gn, and Bn corresponding to the n-th data line Dn are illustrated in FIG. 1 as an example.

The data driver 130 may generate switch control signals Rsel, Gsel, and Bsel in response to the second control signal CS2. Switches 113, 114, and 115 disposed on the color data lines Rn, Gn, and Bn, respectively, may be turned on or off by the switch control signals Rsel, Gsel, and Bsel, respectively. When the switches 113 through 115 are turned on and a signal for turning on or off the switching elements 111Rmn, 111Gmn, and 111Bmn is input to the gate line Gm, capacitors 112Rmn, 112Gmn, and 112Bmn may be charged through the color data lines Rn, Gn, and Bn, respectively.

The control block 150 may receive a third control signal CS3 from the timing controller 140 and may provide different bias currents or voltages to the data driver 130 in response to the third control signal CS3. For instance, the control block 150 may output a first bias current or voltage to the data driver 130 when the third control signal CS3 is "0" and may output a second bias current or voltage to the data driver 130 when the third control signal CS3 is "1". In one or more embodiments, the first bias current or voltage may be higher than the second bias current or voltage.

Referring to FIG. 1, three switching elements 111Rmn, 111Gmn, and 111Bmn are illustrated as being provided for each of the data lines D1 through DN, but embodiments are not limited thereto. For instance, less than or greater than three switching elements, e.g., two or four switching elements may be provided. In detail, color data lines are not restricted to the color data lines Rn, Gn, and Bn illustrated in FIG. 1 and may be changed, so that switching elements may also be changed. In addition, the color data lines Rn, Gn, and Bn are respectively and independently controlled by the switching elements 111Rmn, 111Gmn, and 111Bmn in the exemplary embodiment illustrated in FIG. 1, but this may be changed by making a change in switching elements.

Figure 2:
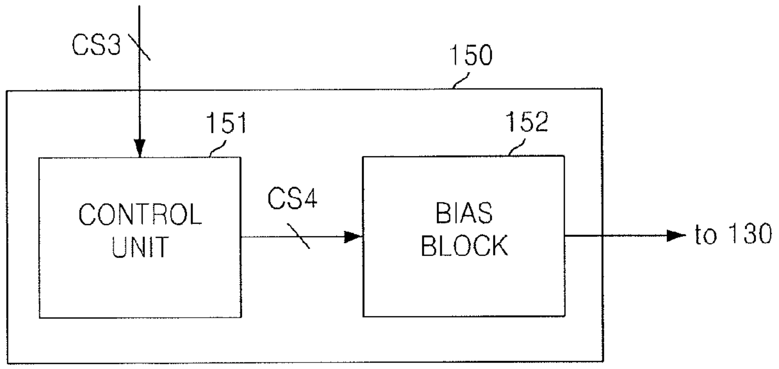
FIG. 2 illustrates a block diagram of a control block of the display device illustrated in FIG. 1.

FIG. 2 illustrates a block diagram of the control block 150 illustrated in FIG. 1. Referring to FIG. 2, the control block 150 may include a control unit 151 and a bias block 152.

The control unit 151 may receive the third control signal CS3 from the timing controller 140 and may control the bias block 152 based on the third control signal CS3. The control unit 151 may include a multiplexer (not shown) which generates a fourth control signal CS4 for controlling the bias block 152 in response to the third control signal CS3.

The bias block 152 may selectively provide the first bias current (or voltage) or the second bias current (or voltage) to the data driver 130 in response to the fourth control signal CS4.

Figure 3:
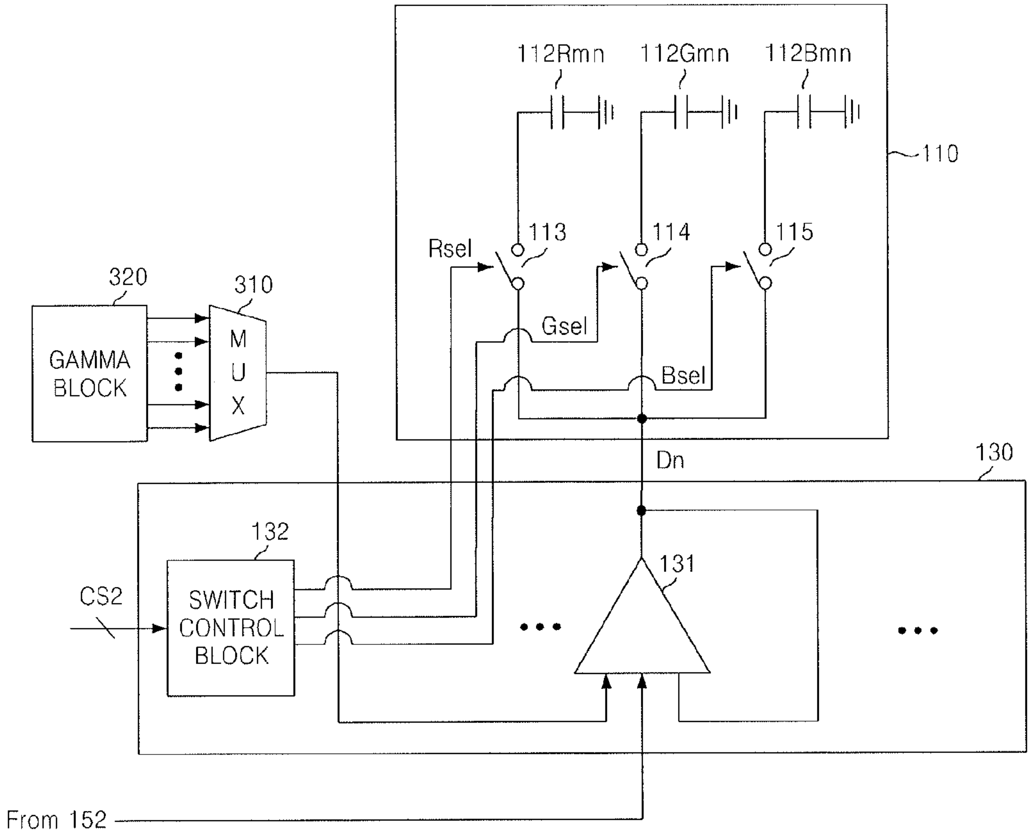
FIG. 3 illustrates a schematic diagram of an exemplary operation of the data driver illustrated in FIG. 1.

FIG. 3 illustrates a schematic diagram of an exemplary operation of the data driver 130 illustrated in FIG. 1. Referring to FIG. 3, the data driver 130 may include an amplifier for each data line. In FIG. 3, an amplifier 131 connected to the n-th data line Dn is illustrated as an example. The data driver 130 may include a switch control block 132. In FIG. 3, the gate line Gm and the switching elements 111Rmn, 111Gmn, and 111Bmn connected to the gate line Gm as illustrated in FIG. 1 are omitted.

In one or more embodiments, the bias block 152 may be configured to supply a plurality of bias currents (or voltages). By selectively employing the plurality of bias currents (or voltages), one or more embodiments may enable a current and/or voltage consumptions may be reduced and/or minimized while enabling fast slew rates to be achieved. More particularly, e.g., in one or more embodiments during periods when fast slew rates are advantageous and/or necessary, e.g., during periods involving charging/discharging of capacitors, higher bias currents (or voltages) may be supplied and employed, while during periods when fast slew rates are not advantageous and/or necessary, lower bias currents (or voltages) may be supplied and employed.

More particularly, referring to FIGS. 1-3, e.g., in one or more embodiments, the amplifier 131 may receive the first bias current (or voltage) or the second bias current (or voltage) from the bias block 152 and may output a data signal to the n-th data line Dn in response to a signal output from a multiplexer 310. The multiplexer 310 may select a signal from among a plurality of (e.g., 256) gamma signals output from a gamma block 320 and may output the selected signal. In FIG. 3, the multiplexer 310 and the gamma block 320 are illustrated as being located outside of the data driver 130, but embodiments are not limited thereto. For example, the multiplexer 310 and the gamma block 320 may be provided in the data driver 130.

The data signal may be input to the capacitors 112Rmn, 112Gmn, and 112Bmn in response to the switch control signals Rsel, Gsel, and Bsel output from the switch control block 132, so that the capacitors 112Rmn, 112Gmn, and 112Bmn may be respectively charged. The switch control signals Rsel, Gsel, and Bsel may have a value of "0" or "1". More particularly, in the following description it will be assumed that when the switch control signals Rsel, Gsel, and Bsel are "0", the switches 113, 114, and 115 are turned on. Referring to FIGS. 1 and 3, the switch control signals Rsel, Gsel, and Bsel may be determined based on the second control signal CS2.

More particularly, e.g., the gamma block 320 may output data values 0 through 255 to the multiplexer 310 and the multiplexer 310 may select one value from among the data values 0 through 255 and output the selected value to the amplifier 131. When the switch control signal Rsel output from the switch control block 132 is "0" and the switch control signals Gsel and Bsel are "1", the switch 113 is turned on and the switches 114, 115 are turned off. At this time, if the red component of an input signal has a value of 100 from among the data values 0 through 255, the multiplexer 310 selects and outputs the data value of 100 to the amplifier 131. If the amplifier 131 outputs a data signal corresponding to "100", the capacitor 112Rmn may be charged to a voltage of $^{100}/_{255}$.

When the switch control signal Gsel output from the switch control block 132 is "0" and the switch control signals Rsel and Bsel are "1", the switch 114 is turned on and the switches 113, 115 are turned off. At this time, if the green component of an input signal has a value of 255 from among the data values 0 through 255, the multiplexer 310 selects and outputs the data value of 255 to the amplifier 131. If the amplifier 131 outputs a data signal corresponding to "255", the capacitor 112Gmn may be charged to a voltage of $^{255}/_{255}$.

When the switch control signal Bsel output from the switch control block 132 is "0" and the switch control signals Rsel and Gsel are "1", the switch 115 is turned on and the switches 113, 114 are turned off. At this time, if the blue component of an input signal has a value of 0 from among the data values 0 through 255, the multiplexer 310 selects and outputs the data value of 0 to the amplifier 131. If the amplifier 131 outputs a data signal corresponding to "0", the capacitor 112Bmn may be charged to a voltage of $^{0}/_{255}$.

Figure 4:
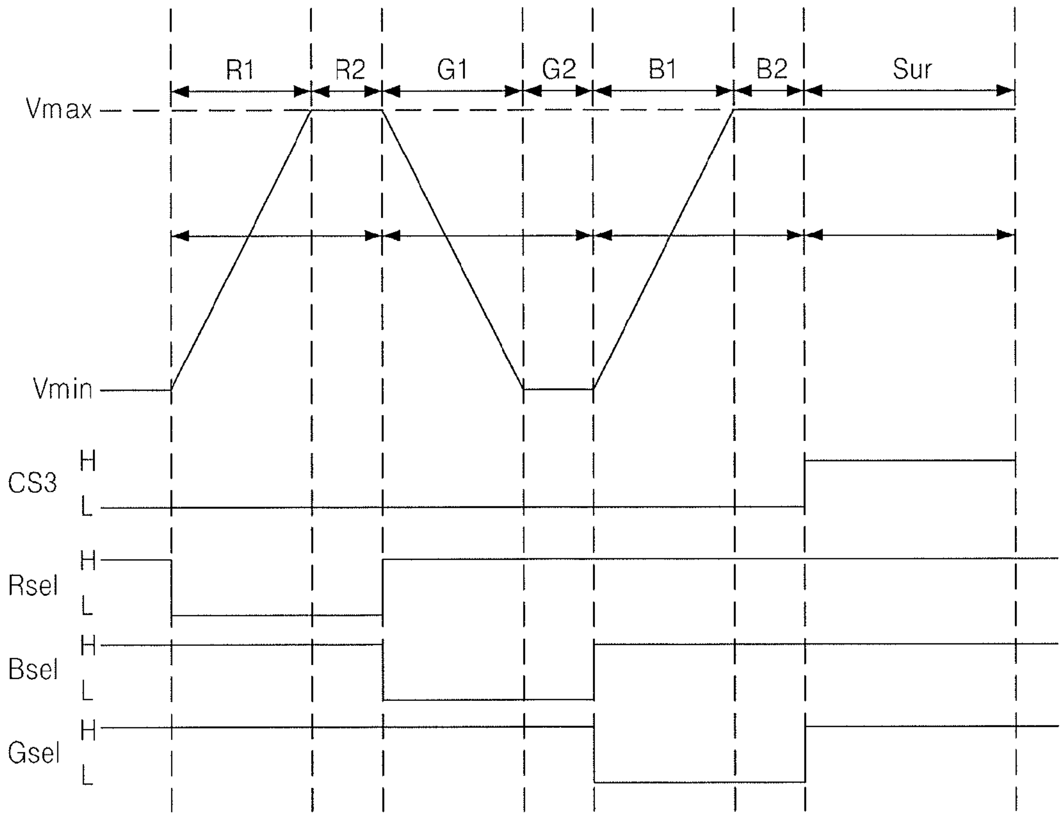
FIG. 4 illustrates an exemplary timing diagram employable for driving the exemplary display device illustrated in FIG. 1 according to one or more embodiments.

FIG. 4 illustrates an exemplary timing diagram employable for driving the exemplary device 100 illustrated in FIG. 1 according to one or more embodiments.

Referring to FIG. 4, a first period R1+R2 corresponds to a data signal of a red component. During the first period R1+R2, only the switch control signal Rsel may be at a logic low while the switch control signals Bsel and Gsel are at a logic high. Accordingly, the switch 113 is turned on and the capacitor 112Rmn may be charged to a voltage corresponding to a difference between a minimum voltage Vmin and a maximum voltage Vmax. During the first period R1+R2, the switches 114, 115 are turned off.

A second period G1+G2 corresponds to a data signal of a green component. During the second period G1+G2, only the switch control signal Gsel may be at a logic low while the switch control signals Rsel and Bsel are at a logic high. Accordingly, the switch 114 is turned on and the capacitor 112Gmn may be charged to a voltage corresponding to a difference between the minimum voltage Vmin and the maximum voltage Vmax. During the second period G1+G2, the switches 113, 115 are turned off.

A third period B1+B2 corresponds to a data signal of a blue component. During the third period B1+B2, only the switch control signal Bsel may be at a logic low while the switch control signal Rsel and Gsel are at a logic high. Accordingly, the switch 115 is turned on and the capacitor 112Bmn may be charged to the voltage corresponding to the difference between the minimum voltage Vmin and the maximum voltage Vmax. During the third period B1+B2, the switches 113, 114 are turned off.

During a fourth period Sur, the switch control signals Rsel, Gsel, and Bsel may all be at a logic high, and the switches 113 through 115 may all be turned off.

In one or more embodiments, a faster slew rate may at least be achieved during the first period R1+R2, the second period G1+G2, and the third period B1+B2, during which the capacitors 112Rmn, 112Gmn, and 112Bmn are charged or discharged, as compared to conventional devices by making a plurality of bias currents (or voltages) available. In the exemplary embodiments described herein, during the fourth period Sur, the slew rate may be slower, but embodiments are not limited thereto. In one or more embodiments, during periods in which a faster slew rate would be advantageous, the first bias current (or voltage) may be provided. More particularly, e.g., in the exemplary embodiment illustrated in FIG. 4, the first bias current (or voltage) may be supplied during the first period R1+R2, the second period G1+G2, and the third period B1+B2, and but not during the fourth period Sur.

The control unit 151 may output the fourth control signal CS4 in response to the third control signal CS3 from the timing controller 140, and based on the fourth control signal CS4, the bias block 152 may output one of the plurality of bias currents (or voltages), e.g., the first bias current (or voltage) or the second bias current (or voltage), to the data driver 130. For instance, when the third control signal CS3 is at a logic low, the bias block 152 may be controlled by the control unit 151 to output the first bias current (or voltage). More particularly, e.g., when the third control signal CS3 is at a logic high, the bias block 152 may be controlled by the control unit 151 to output the second bias current (or voltage).

In one or more embodiments, different bias currents (or voltages) may be provided through the circuit illustrated in FIG. 1. One or more embodiments may be advantageous over conventional devices at least by enabling lower power consumption by, e.g., employing a plurality of bias voltages such that a relatively lower bias voltage (or current) or relatively higher bias voltage (or current) may be employed during different periods. More particularly, e.g., one or more embodiments may be advantageous over conventional devices at least by enabling lower power consumption by, e.g., employing a plurality of bias voltages such that a relatively lower bias voltage (or current) or relatively higher bias voltage (or current) may be employed during different periods based on circuit performance factors, e.g., slew rate. Accordingly, one or more embodiments may reduce overall current consumption by employing a plurality of different bias currents (or voltages).

Figure 5:
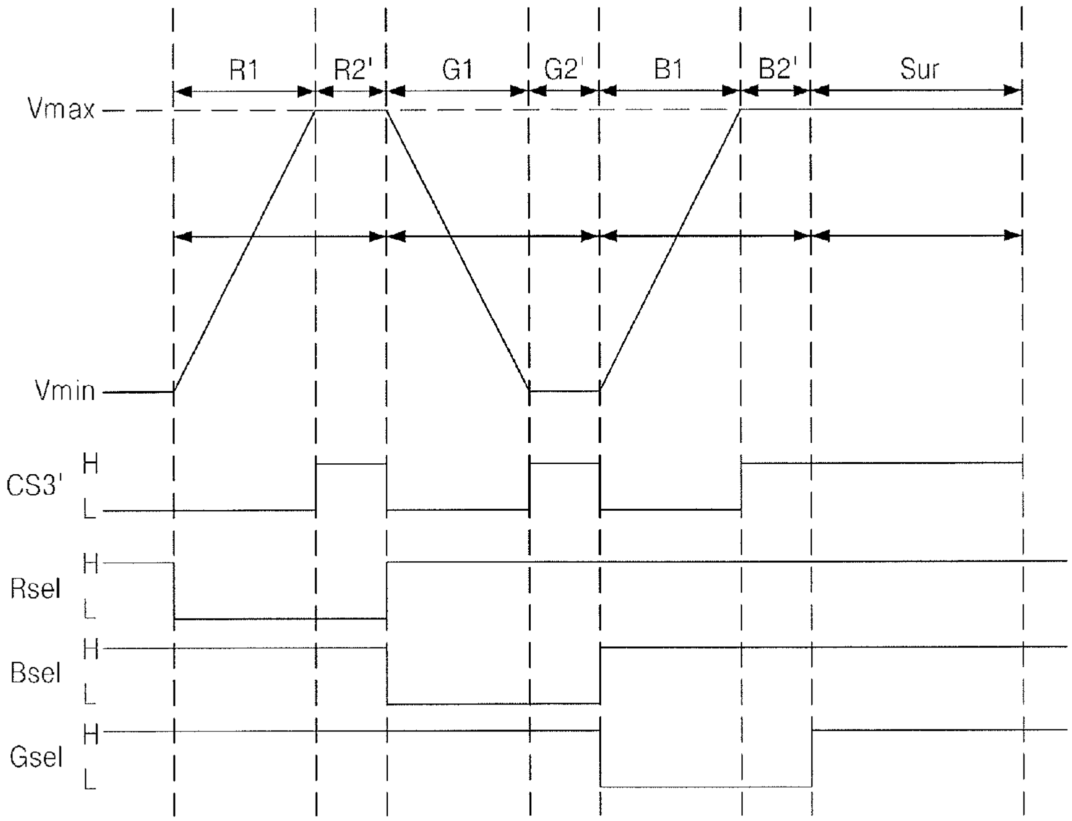
FIG. 5 illustrates another exemplary timing diagram employable for driving the exemplary display device illustrated in FIG. 1 according to one or more embodiments.

FIG. 5 illustrates another exemplary timing diagram employable for driving the exemplary device 100 illustrated in FIG. 1 according to one or more embodiments.

Referring to FIG. 5, a first period R1+R2' corresponds to a data signal of a red component. During the first period R1+R2', the switch control signal Rsel may be at a logic low while the switch control signals Bsel and Gsel are at a logic high. Accordingly, the switch 113 is turned on and the capacitor 112Rmn may be charged to a voltage corresponding to a difference between a minimum voltage Vmin and a maximum voltage Vmax. During the first period R1+R2', the switches 114, 115 are turned off.

A second period G1+G2' corresponds to a data signal of a green component. During the second period G1+G2', the switch control signal Gsel may be at a logic low while the switch control signals Rsel and Bsel are at a logic high. Accordingly, the switch 114 is turned on and the capacitor 112Gmn may be charged to a voltage corresponding to a difference between the minimum voltage Vmin and the maximum voltage Vmax. During the second period G1+G2', the switches 113, 115 are turned off.

A third period B1+B2' corresponds to a data signal of a blue component. During the third period B1+B2', only the switch control signal Bsel are at a logic low while the switch control signal Rsel and Gsel may be at a logic high. Accordingly, the switch 115 is turned on and the capacitor 112Bmn may be charged to the voltage corresponding to the difference between the minimum voltage Vmin and the maximum voltage Vmax. During the third period B1+B2', the switches 113, 114 are turned off.

During the fourth period Sur, the switch control signals Rsel, Gsel, and Bsel may all be at a logic high, and the switches 113, 114, and 115 may all be turned off.

In contrast to the exemplary operation illustrated in FIG. 4, in one or more embodiments employing the approach illustrated in FIG. 5, the first bias voltage (or relatively higher bias voltage or current) may not be applied during the periods R2' in the first period R1+R2', the period G2' in the second period G1+G2', and the period B2' in the third period B1+B2', e.g., a. More particularly, in one or more embodiments the first bias voltage (or current) may be applied during periods including slew rate affecting activity, e.g., charging/discharging the capacitors 112Rmn, 112Gmn, and 112Bmn. More particularly, referring to the exemplary embodiment of FIG. 5, a third control signal CS3' may be at a logic high level during the periods R2', G2', B2', and may be at a logic low level during the periods R1, G1, B1.

Referring to FIGS. 3 and 5, since the capacitors 112Rmn, 112Gmn, and 112Bmn may actually be charged or discharged during the period R1 in the first period R1+R2', the period G1 in the second period G1+G2', and the period B1 in the third period B1+B2', the first bias current (or voltage) may be provided only those periods R1, G1, and B1.

For instance, when the third control signal CS3 is at a logic low, the bias block 152 may be controlled by the control unit 151 to output the first bias current (or voltage). When the third control signal CS3 is at a logic high, the bias block 152 may be controlled by the control unit 151 to output the second bias current (or voltage) that is a relatively lower bias current (or voltage) compared to the first bias current (or voltage). In detail, the bias block 152 may provide the first bias power (i.e., a relatively higher bias current or voltage) during the periods R1, G1, and B1 while the third control signal CS3 may be at the logic low and may provide the second bias power (i.e., a relatively lower bias current or voltage) during the periods R2', G2', and B2', and the fourth period Sur.

In one or more embodiments, different bias currents (or voltages) may be provided through the circuit illustrated in FIG. 1. More particularly, one or more embodiments may be advantageous over conventional devices at least by enabling lower power consumption by, e.g., employing a plurality of bias voltages such that a relatively higher bias voltage (or current) may be employed during predetermined periods of operation, e.g., periods during which slew rate affecting activity may occur, and employing a relatively lower bias voltage (or current) during other periods. More particularly, e.g., one or more embodiments may be advantageous over conventional devices at least by enabling lower power consumption by, e.g., employing a plurality of bias voltages such that a relatively lower bias voltage (or current) or relatively higher bias voltage (or current) may be employed during different periods based on circuit performance factors, e.g., slew rate. Accordingly, in contrast, e.g., to devices employing a single constant bias current, one or more embodiments may reduce overall current consumption by employing a plurality of different bias currents (or voltages).

One or more embodiments may enable current or voltage consumption in a display device to be reduced while a slew rate is maintained or increased, so that economic efficiency is increased.

While features have been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A circuit for controlling a data driver of a display device, the circuit comprising:

a bias block configured to provide a bias power to an amplifier included in the data driver, the amplifier connected to a data line and outputting a data signal to the data line according to a slew rate corresponding to the bias power; and a control unit configured to control the bias block to selectively output one of a first bias power or a second bias power, which have different magnitudes, to the data driver based on a control signal input to the control unit, wherein the bias block provides the first bias power or the second bias power to the data driver according to control of the control unit, wherein:

the first bias power is supplied to the amplifier during a first period, the first period corresponds to charging or discharging of one or more pixel capacitors to an image data value based on the first bias power, and the second bias power is supplied to the amplifier during a second period different from the first period, wherein the first bias power corresponds to a first slew rate for charging or discharging the one or more pixel capacitors and the second bias corresponds to a second slew rate different from the first slew rate.

2. The circuit as claimed in claim 1, wherein the magnitude of the first bias power is greater than that of the second bias power.

3. The circuit as claimed in claim 1, wherein the control unit controls the bias block to output the first bias power when the control signal is at a first logic level and controls the bias block to output the second bias power when the control signal is at a second logic level.

4. The circuit as claimed in claim 1, wherein the control signal varies with a data or source signal.

5. A display device, comprising:

a panel including a plurality of pixels arranged in a matrix form;

a timing controller configured to output a plurality of control signals;

a data driver configured to output data signals to data lines connected to pixel capacitors of the plurality of pixels, the data driver to output the data signals to the data lines based on one of the plurality of control signals output from the timing controller; and a control circuit configured to selectively provide one of a first bias power or a second bias power, which have different magnitudes, to an amplifier included in the data driver based on one of the plurality of control signals, wherein the amplifier is connected to the data line and outputs the data signal to the data line according to a slew rate corresponding to one of the first bias power or the second bias power, each of the pixel capacitors to store a voltage corresponding to one of a plurality of image data values to be emitted by a corresponding pixel wherein the first bias power corresponds to a first slew rate for charging or discharging the pixel capacitors and the second bias corresponds to a second slew rate different from the first slew rate.

6. The display device as claimed in claim 5, further comprising a gate driver configured to output signals for turning on or off switching elements of the respective pixels based on one among the plurality of control signals output from the timing controller.

7. The display device as claimed in claim 5, wherein the magnitude of the first bias power is greater than that of the second bias power.

8. The display device as claimed in claim 5, wherein the control circuit comprises:

a bias block configured to selectively output one of the first bias power and the second bias power to the data driver; and a control unit configured to control the bias block to selectively output one of the first bias power and the second bias power based on one among the plurality of control signals output from the timing controller.

9. The display device as claimed in claim 8, wherein the control unit controls the bias block to output the first bias power when the control signal is at a first logic level and controls the bias block to output the second bias power when the control signal is at a second logic level.

10. The display device as claimed in claim 8, wherein the panel includes at least one color data line connected to each of the data lines.

11. The display device as claimed in claim 10, wherein each of the data lines is connected to the at least one color data line via at least one switch, which is turned on or off based on at least one switch control signal output from the data driver.

12. The display device as claimed in claim 11, wherein the data driver includes a switch control block configured to output the at least one switch control signal based on one among the plurality of control signals output from the timing controller and to turn on or off the at least one switch.

13. The display device as claimed in claim 12, wherein the at least one switch receiving the at least one switch control signal is turned on when the at least one switch control signal is at a first logic level and is turned off when the at least one switch control signal is at a second logic level.

14. The display device as claimed in claim 12, wherein the amplifier is connected to each of the data lines.

15. The display device as claimed in claim 14, wherein the amplifier receives the first bias power or the second bias power from the bias block.

16. The display device as claimed in claim 12, wherein the control unit is configured to control the bias block to output the first bias power when one of the at least one switch control signal is at a first logic level.

17. The display device as claimed in claim 12, wherein the control unit controls the bias block to output the second bias power when all of the at least one switch control signal is at a second logic level.

18. The display device as claimed in claim 12, wherein the control signal is at the first logic level while data signals output from the data driver are supplied to the pixel capacitors in the panel.

19. A circuit for controlling a data driver of a display device including a panel including a plurality of pixels, the circuit comprising:

a biasing block configured to supply one of a plurality of different biasing powers to a amplifier included in the data driver, the amplifier is connected to a data line and outputs a data signal to the data line according to a slew rate corresponding to one of the plurality of different biasing powers, a selector configured to select one of the plurality of different biasing powers, wherein the plurality of biasing powers include a first biasing power and a second biasing power, the first biasing power being greater than the second biasing power, wherein the selector is configured to select the first biasing power to be supplied to the amplifier when an operation having an increased slew rate is to be performed and is configured to select the second biasing power when an operation having a slew rate different from the increased slew rate is to be performed, and wherein the first bias power is supplied to the amplifier during a first period, the first period corresponds to charging or discharging of one or more pixel capacitors to an image data value based on the first bias power, and the second bias power is supplied to the amplifier during a second period different from the first period.

* * * * *